(12) United States Patent
Ackermann et al.

(10) Patent No.: US 12,143,930 B2
(45) Date of Patent: Nov. 12, 2024

(54) SIGNAL-REPEATER DEVICE OPERABLE IN LOW-POWER REPEATER-OPERATIONAL MODE

(71) Applicant: SIGNIFY HOLDING B.V., Eindhoven (NL)

(72) Inventors: Bernd Ackermann, Aachen (DE); Harald Josef Günther Radermacher, Aachen (DE); Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 343 days.

(21) Appl. No.: 17/418,089

(22) PCT Filed: Dec. 17, 2019

(86) PCT No.: PCT/EP2019/085593
§ 371 (c)(1),
(2) Date: Jun. 24, 2021

(87) PCT Pub. No.: WO2020/144010
PCT Pub. Date: Jul. 16, 2020

(65) Prior Publication Data
US 2022/0104120 A1    Mar. 31, 2022

(30) Foreign Application Priority Data

Jan. 10, 2019 (EP) .................................... 19151125

(51) Int. Cl.
*H04W 52/02* (2009.01)
*H04L 1/00* (2006.01)
*H04L 1/08* (2006.01)

(52) U.S. Cl.
CPC ....... *H04W 52/0206* (2013.01); *H04L 1/0025* (2013.01); *H04L 1/08* (2013.01)

(58) Field of Classification Search
CPC ..... H04W 52/0206; H04L 1/0025; H04L 1/08
See application file for complete search history.

(56) References Cited

U.S. PATENT DOCUMENTS

| 7,535,378 B2 | 5/2009 | Cornwall |
| 9,749,958 B1* | 8/2017 | Segev ............... H04W 52/0229 |

(Continued)

FOREIGN PATENT DOCUMENTS

| JP | 2003-047177 A | 2/2003 |
| JP | 2012-010261 A | 1/2012 |

(Continued)

*Primary Examiner* — Charles N Appiah
*Assistant Examiner* — Nicole M Louis-Fils

(57) ABSTRACT

The invention relates to a signal-repeater device (308) being operable in a regular repeater-operation mode and in a low-power repeater-operation mode requiring less operational power than the regular repeater-operation mode, and that comprises a signal processing unit (316) which performs, in the regular repeater-operation mode, a signal receiving function and a signal repeating function, and an operation control unit (318) configured to determine status information indicative of associated external transceiver devices being respectively operated in a low-power transceiver-operation mode, operate the signal processing unit in the low-power repeater-operation mode by switching off the signal repeating function upon determining, based on the determined status information, that each of the associated external wireless transceiver devices is being operated in the low-power transceiver-operation, thus reducing the power consumption of the signal-repeater device, and switch to operation of the signal processing unit in the regular repeater-operation mode upon reception of a predetermined repeater-wake-up signal.

14 Claims, 6 Drawing Sheets

(56) References Cited

U.S. PATENT DOCUMENTS

| | | | |
|---|---|---|---|
| 2010/0325456 A1 | 12/2010 | Wendt et al. | |
| 2013/0028157 A1* | 1/2013 | Ruster | H04W 52/0206 370/311 |
| 2013/0286912 A1* | 10/2013 | Xu | H04B 7/14 370/311 |
| 2014/0110613 A1* | 4/2014 | Pitchford | F16K 31/082 251/129.01 |
| 2015/0244816 A1* | 8/2015 | Pagani | H04L 67/145 370/329 |
| 2016/0007285 A1 | 1/2016 | Jeon et al. | |
| 2017/0366249 A1* | 12/2017 | Van Oost | H04W 52/0206 |
| 2018/0139695 A1 | 5/2018 | Gupta et al. | |

FOREIGN PATENT DOCUMENTS

| | | | |
|---|---|---|---|
| JP | 2015-122572 A | 7/2015 | |
| JP | 2015-177283 A | 10/2015 | |
| JP | 2015-177284 A | 10/2015 | |
| KR | 20140028717 * | 3/2014 | H04N 21/2343 |
| WO | 2009003319 A1 | 1/2009 | |
| WO | 2012/114969 A1 | 8/2012 | |
| WO | 2017116583 A1 | 7/2017 | |

\* cited by examiner

SIGNAL-REPEATER DEVICE OPERABLE IN LOW-POWER REPEATER-OPERATIONAL MODE

CROSS-REFERENCE TO PRIOR APPLICATIONS

This application is the U.S. National Phase application under 35 U.S.C. § 371 of International Application No. PCT/EP2019/085593, filed on Dec. 17, 2019, which claims the benefit of European Patent Application No. 19151125.2, filed on Jan. 10, 2019. These applications are hereby incorporated by reference herein.

FIELD OF THE INVENTION

The invention is directed to a signal-repeater device, to a method for operating a signal-repeater device, to a wireless communication arrangement and to a computer program.

BACKGROUND OF THE INVENTION

U.S. Pat. No. 7,535,378 B2 describes a communication arrangement in the form of a meter reading system that enables transmission of data between utility meter end nodes and a reader device. A particular embodiment of this arrangement comprises a signal-repeater device that can operate in a sleep mode when it is not required to get data from the end nodes. In the case of monthly reads, the signal-repeater device stays asleep for most of the month and then turns on and acquires its end nodes near the reading time.
WO 2009/003319 A1 discloses controlling a relay station in a base station in wireless relay network, while in a sleep mode.

SUMMARY OF THE INVENTION

It would be beneficial to enable a more flexible low-power operation of a signal-repeater device.

According to a first aspect of the present invention, a signal-repeater device for wireless signals is presented. The signal-repeater device comprises a signal processing unit which is configured to perform a signal receiving function involving reception of wireless input signals which transport payload information or control information between an external network gateway device and one or more external wireless transceiver devices associated with the signal-repeater device, and which is configured to perform, in a regular repeater-operation mode, the signal receiving function and a signal repeating function involving a retransmission of an amplified wireless output signal carrying the payload information or the control information.

The signal-repeater device also comprises an operation control unit which is configured to operate the signal processing unit in the regular repeater-operation mode and in a low-power repeater-operation mode, in which the signal repeating function is switched off, to determine status information indicative of the associated external transceiver devices being respectively operated in a low-power transceiver-operation mode, to switch off the signal repeating function upon determining from the status information that each of the one or more associated external wireless transceiver devices is being operated in the low-power transceiver-operation mode. While the signal processing unit is being operated in the low-power repeater-operation mode, the operation control unit is configured to await reception of a predetermined repeater-wake-up signal, and, upon reception thereof, to switch to operation of the signal processing unit in the regular repeater-operation mode.

The signal-repeater device of the first aspect enables flexibility in low-power repeater operation since it is configured to switch off the signal repeating function upon determining, from the status information, that each of the one or more associated external wireless transceiver devices is being operated in the low-power transceiver-operation mode, and thus, are not expected to provide wireless signals for communication with the network gateway device. Furthermore, while the operating control unit is operating the signal-repeater device in the low-power repeater-operation mode, any transmission of the network gateway device for communication with any of the wireless transceiver devices associated with the signal-repeater device, or vice versa, will cause the operation control unit of the signal-repeater device to switch to the regular repeater-operation mode. The achieved power reduction capability is thus fully adaptive to current communication requirements of the wireless transceiver devices associated with the signal-repeater device.

In the following, embodiments of the signal-repeater device of the first aspect of the invention will be presented.

Suitably, the repeater-wake-up signal is a dedicated signal used for the wake-up purpose only. As such, the repeater-wake-up signal can be received by the signal-repeater device from any of the associated wireless transceiver devices or from the network gateway device, depending on the requirements of the application case.

In other embodiments, however, the repeater-wake-up signal is not a dedicated wake-up signal. Instead, the operation control unit is configured to interpret any wireless signal provided by the network gateway device or by any of the associated wireless transceiver devices and directed to the respective other device as the wake-up signal, irrespective of payload information or any further control information it transports. Thus, while in the low-power repeater-operation mode, any communication attempt between the network gateway device and any of the network transceiver devices associated with the signal-repeater device will cause the operation control unit to switch to operation of the signal-repeater device in the regular repeater-operation mode.

In one embodiment of the signal-repeater device of the first aspect, the operation control unit is configured, upon reception of the repeater-wake-up signal, to trigger a provision of a wireless transceiver-wake-up signal for instructing the at least one external wireless transceiver devices to switch off the low-power transceiver-operation mode and return to operation in a regular transceiver-operation mode.

In an embodiment, the wireless transceiver-wake-up signal is directed to all associated wireless transceiver devices. In another embodiment the wireless transceiver-wake-up signal is directed to a predetermined sub-group of associated wireless transceiver devices, thus enabling a selective wake-up of only part of the associated wireless transceiver devices.

In an embodiment wireless signals are exchanged in accordance with a predetermined wireless communication protocol. Suitable wireless communication protocols include, but are not limited to, IEEE 802.11, Bluetooth and ZigBee.

The repeater-wake-up signal suitably is also a wireless signal. In some embodiments, the repeater-wake-up signal is in accordance with the same wireless communication protocol as that used for exchanging the wireless signals. It is thus detected using the signal receiving function of the signal processing unit. A further reduction of power consumption is enabled by allowing an additional discontinuation of the signal-receiving function of the signal processing unit while operating in the low-power repeater-operation mode. Thus, in order to save power in this kind of embodiments, the operation control unit is suitably configured to control operation of the signal processing unit to perform the signal receiving function in the low-power repeater-operation mode in a duty-cycled manner. Thus, the signal receiving function is performed only during predetermined time spans, suitably in a periodic manner, and is switched off by the operation control unit during the remaining times.

In other embodiments, the repeater-wake-up signal is in accordance with a wireless communication protocol different from that of the wireless signals retransmitted using the signal repeating function. Some such embodiments of the signal-repeater device comprise a low-power wake-up radio (LP-WUR) receiver unit configured to receive, while the signal-repeater device is operating in the low-power repeater-operation mode, the repeater-wake-up signal and to forward it to the operation control unit and not to the signal processing unit. This way, the signal receiving function of the signal processing unit can be switched off at all times during the low-power repeater-operation mode, contributing to even further increased savings of operational power. Suitably, the LP-WUR comprises a signal receiver that is solely used to receive the repeater-wake-up signal. This way, the signal detection can be made using particularly simple and power-saving receiver hardware, further contributing to desirable power savings.

Preferably, the low-power wake-up radio receiver unit is configured to receive the repeater-wake-up signal in a frequency band different from that used for the signal-receiving function of the signal processing unit.

In some alternative embodiments, the operation control unit of the signal-repeater device has a wired control input port with a wake-up receiver for receiving the repeater-wake-up signal via a wired connection.

Combinations of the described wired and wireless options for receiving and processing the repeater-wake-up signal are used in additional embodiments.

Further embodiments of the signal-repeater device provide different variants of power supply and power management. In one embodiment in accordance with the first aspect of the invention, the signal-repeater device further comprises a power input interface configured to receive, from an external mains power-supply, operational power suitable for operating the operation control unit and the signal processing unit in the regular repeater-operation mode. The signal-repeater device also comprises a secondary power supply unit that is configured to provide operational power suitable for operating the operation control unit and the signal processing unit in the low-power repeater-operation mode. In this embodiment, the operation control unit is advantageously configured to switch a supply of operational power between the mains power-supply and the secondary power supply unit depending on whether the signal processing unit is to be operated in the regular repeater-operation mode or in the low-power repeater-operation mode.

Suitable secondary power supply units include, but are not limited to, power supply units comprising a battery, a rechargeable battery, a capacitor, a super capacitor, or a photovoltaic device, for providing operational power suitable for operating the operation control unit and the signal processing unit in the low-power repeater-operation mode.

In a preferred embodiment, the secondary power supply unit comprises a rechargeable internal power supply device, such as, but not limited to a rechargeable battery, a capacitor or a super capacitor, and a radio-power harvesting unit. The radio-power harvesting unit includes a radio receiver interface and is configured to collect electromagnetic power from received radio signals, to transform at least parts of the collected electromagnetic power into electrical power and to charge the rechargeable internal power supply device with the electrical power for powering operation of the signal-repeater device in the low-power repeater-operation mode.

In another embodiment of the signal-repeater device of the first aspect, the operation control unit is configured to evaluate received operation capability data indicative of a capability of the respective external wireless transceiver devices to be operated in the low-power transceiver-operation mode, and upon determining that not all associated external wireless transceiver devices are capable of being operated in the low-power transceiver-operation mode, to refrain from determining the status information, thereby operating the signal processing unit only in the regular repeater-operation mode. This embodiment enables a reduction of power consumption by discontinuing the determination of the status information whenever it is determined that at least one of the associated wireless transceiver devices is not operable in the low-power transceiver-operation mode. The operational power amount required for the determination of status information and all associated functionality, which involves determining whether or not each of the one or more associated external wireless transceiver devices is being operated in the low-power transceiver-operation mode and switching off the signal repeating function is then saved, thus reducing at least some power consumed by the signal-repeater device even if the low-power repeater-operation mode cannot be used in view of the given network associations.

In a preferred embodiment, the operation control unit is further configured, upon determining that not all associated external wireless transceiver devices are capable of being operated in the low-power transceiver-operation mode, to provide an operation-mode warning signal indicative thereof, which is preferably directed to the external network gateway device.

In another embodiment of the signal-repeater device of the first aspect of the present invention, the operation control unit is configured to maintain an updatable transceiver-device list comprising transceiver-device data identifying:
- a maximum number of external wireless transceiver devices that can be simultaneously associated to the signal-repeater device;
- currently associated external wireless transceiver devices within a signal extension range of the signal-repeater device;
- currently non-associated wireless transceiver devices within the signal extension range of the signal-repeater device; and
- those currently associated and those currently non-associated wireless transceiver devices having the capability to be operated in the low-power transceiver-operation mode.

The operation control unit of this embodiment is further configured to refrain from determining the status information, thereby operating the signal processing unit only in the regular repeater-operation mode, while at least one of the currently associated external wireless transceiver devices on the transceiver-device list lacks the capability to be operated in the low-power transceiver-operation mode.

This embodiment also enables a reduction of power consumption by discontinuing the determination of the status information while at least one of the currently associated external wireless transceiver devices on the transceiver-device list lacks the capability to be operated in the low-power transceiver-operation mode. The operational power amount required for the determination of status information and all associated functionality, which involves determining whether or not each of the one or more associated external wireless transceiver devices is being operated in the low-power transceiver-operation mode and switching off the signal repeating function is then saved, thus reducing the power consumed by the signal-repeater device.

An alternative embodiment enables this way of operation under the control of the external network gateway device. In this alternative embodiment, as before, the operation control unit is equally configured to maintain an updatable transceiver-device list comprising transceiver-device data identifying:
- a maximum number of external wireless transceiver devices that can be simultaneously associated to the signal-repeater device;
- currently associated external wireless transceiver devices within a signal extension range of the signal-repeater device;
- currently non-associated wireless transceiver devices within the signal extension range of the signal-repeater device; and
- those currently associated and those currently non-associated wireless transceiver devices having the capability to be operated in the low-power transceiver-operation mode.

However, in this alternative embodiment, the operation control unit is configured to provide the transceiver-device list to the external network gateway device. In such embodiments, wherein the operation control unit is configured to provide the transceiver-device list to the external network gateway device, the operation control unit is suitably further configured to operate the signal processing unit either in the regular repeater-operation mode or in the low-power repeater-operation mode at a given point in time, in dependence on control information received by the signal-repeater device, preferably, but not necessarily from the external network gateway device. In embodiments of this kind, control of associations of the signal-repeater device with external wireless transceiver devices can be exerted either by the external network gateway device or another device for optimizing low-power performance, as will be explained in more detail further below.

In a preferred embodiment, control information received from the external network gateway device comprises an updated transceiver-device list, and the operation control unit is configured to operate the signal processing unit in the regular repeater-operation mode or in the low-power repeater-operation mode in dependence on the transceiver-device data comprised in the updated transceiver-device list. In particular, for instance, if the update transceiver-device list comprises a wireless transceiver device that is not capable of operation in a low-power transceiver-operation mode, the control unit is configured to refrain from determining the status information.

In accordance with a second aspect of the present invention, a wireless communication arrangement is provided. The wireless communication arrangement comprises at least one wireless transceiver device, a network gateway device for relaying data communication between the wireless transceiver device and an external wide range data communication network and at least one signal-repeater device according to the first aspect of the invention or of any of its embodiments. The at least one signal-repeater device is associated with the at least one wireless transceiver device, for performing the repeating function between the network gateway device and the at least one wireless transceiver devices associated with the signal-repeater device.

The wireless communication arrangement of the second aspect thus shares the advantages of the signal-repeater device of the first aspect of the invention or of any of its embodiments.

In the following, embodiments of the wireless communication arrangement of the second aspect will be described.

In a preferred embodiment, the wireless communication arrangement comprises at least two signal-repeater devices, wherein the respective operation control units are configured to maintain the respective updatable transceiver-device lists comprising transceiver-device data, to provide the transceiver-device list to the external network gateway device, and to operate the signal processing unit in the regular repeater-operation mode or in the low-power repeater-operation mode in dependence on control information received from the external network gateway device.

The wireless communication arrangement further comprises an association control unit, which is configured to receive and evaluate the transceiver-device lists provided by the signal-repeater devices, to generate, using the received transceiver-device lists, respective updated transceiver-device lists associating to a respective signal-repeater device, in dependence on the respective capability to be operated in the low-power transceiver-operation mode, a number of wireless transceiver devices that is equal to or lower than the maximum number of external wireless transceiver devices that can be associated to the respective signal-repeater device for maximizing the number of signal-repeater devices operable in the low-power repeater-operation mode and to provide the updated transceiver-device list to the respective signal-repeater device, as the control information.

In a preferred embodiment, the wireless communication arrangement is a lighting-system communication arrangement wherein wirelessly controllable lighting devices, monitoring sensor devices and triggering sensor devices are configured as wireless transceiver devices of the lighting-system communication arrangement.

According to a third aspect of the present invention, a method for operating a signal-repeater device is described. The method comprises, in a regular repeater-operation mode,
- performing a signal receiving function involving reception of wireless input signals which transport payload information or control information between an external network gateway device and one or more external wireless transceiver devices associated with the signal-repeater device;
- performing a signal repeating function involving a retransmission of an amplified wireless output signal carrying the payload information or the control information;
- determining status information indicative of the associated external transceiver devices being respectively operated in a low-power transceiver-operation mode
- switching to a low-power repeater-operation mode, in which the signal repeating function is switched off upon determining from the status information that each of the one or more associated external wireless transceiver devices is being operated in the low-power transceiver-operation mode; and
- while in the low-power repeater-operation mode, awaiting reception of a predetermined repeater-wake-up signal, and, upon reception thereof, switching to operation in the regular repeater-operation mode.

The method of the third aspect shares the advantages of the signal-repeater device of the first aspect or of any of its embodiments.

According to a fourth aspect of the present invention, a computer program comprising instructions which, when the program is executed by a computer, cause the computer to carry out the steps of the method of the third aspect is presented.

It shall be understood that the signal-repeater device, the wireless communication arrangement of claim 11, and the method for operating a signal-repeater device of claim 13, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
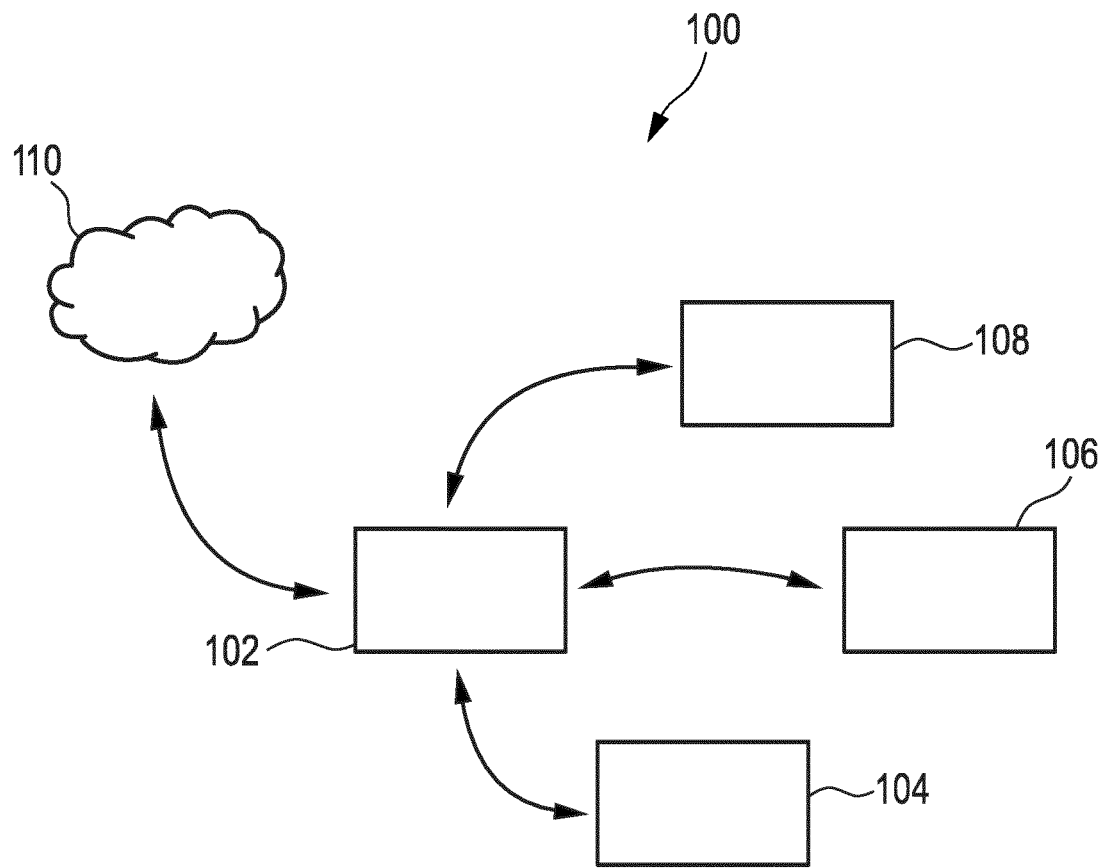
FIG. 1 shows a block diagram of a wireless communication arrangement including a network gateway device or access point and a plurality of wireless transceiver devices or end nodes.

FIG. 1 shows a block diagram of a known wireless communication arrangement 100 comprising one network gateway device 102 and three wireless transceiver devices 104, 106 and 108. The network gateway device 102 is configured to relay data communication between the wireless transceiver devices 104, 106, 108 and an external wide range data communication network 110, such as, for example the Internet. Thus, emphasizing the interaction of the network gateway device with the external wide range data communication network 110, the network gateway device 102 will be also referred to as an access point, and emphasizing the implementation of application functionality in the wireless transceiver devices, the wireless transceiver devices 104, 106, 108 will be also referred to as end nodes of the wireless communication arrangement 100.

The arrows in FIG. 1 indicate transmission of wireless signals between the respective devices. The wireless signals carry payload information or control information. The transmission of the wireless signals is performed in agreement with a predetermined wireless communication protocol. Examples of suitable communication protocols include, but are not limited to, IEEE 802.11, Bluetooth and ZigBee. In another exemplary wireless communication arrangement (not shown) a data connection between the external wide range data communication network 110 and the access point 102 is achieved via a wired connection, for instance using an Ethernet cable, or other suitable wired connection and where the communication between the external wide range data communication network 100 and the access point 102 is performed in accordance with a suitable communication protocol, such as a protocol belonging to the IEEE 802.3 standard. Thus, the term "wireless" in wireless communication arrangement refers mainly to the communication between the access point and at least one of the end nodes.

Typically, the network gateway device or access point 102 will always be active i.e., operate in a regular gateway-device-operation mode, for communicating with the external wide range data communication network 110. On the other hand, and depending on a type and functionality of the wireless transceiver devices or end nodes 104, 106, 108, some of them will occasionally enter a low-power transceiver-operation mode. Examples of a low-power transceiver-operation mode include, a stand-by mode, a sleep mode or other known low-power operation modes of the transceiver device that require less operational power than a regular transceiver-device operation mode. Compromises must be made between latency and energy efficiency of such a wireless communication arrangement. This involves often coordinating with the network gateway device periods of operation of the wireless transceiver devices in low-power transceiver-operation mode.

Figure 2:
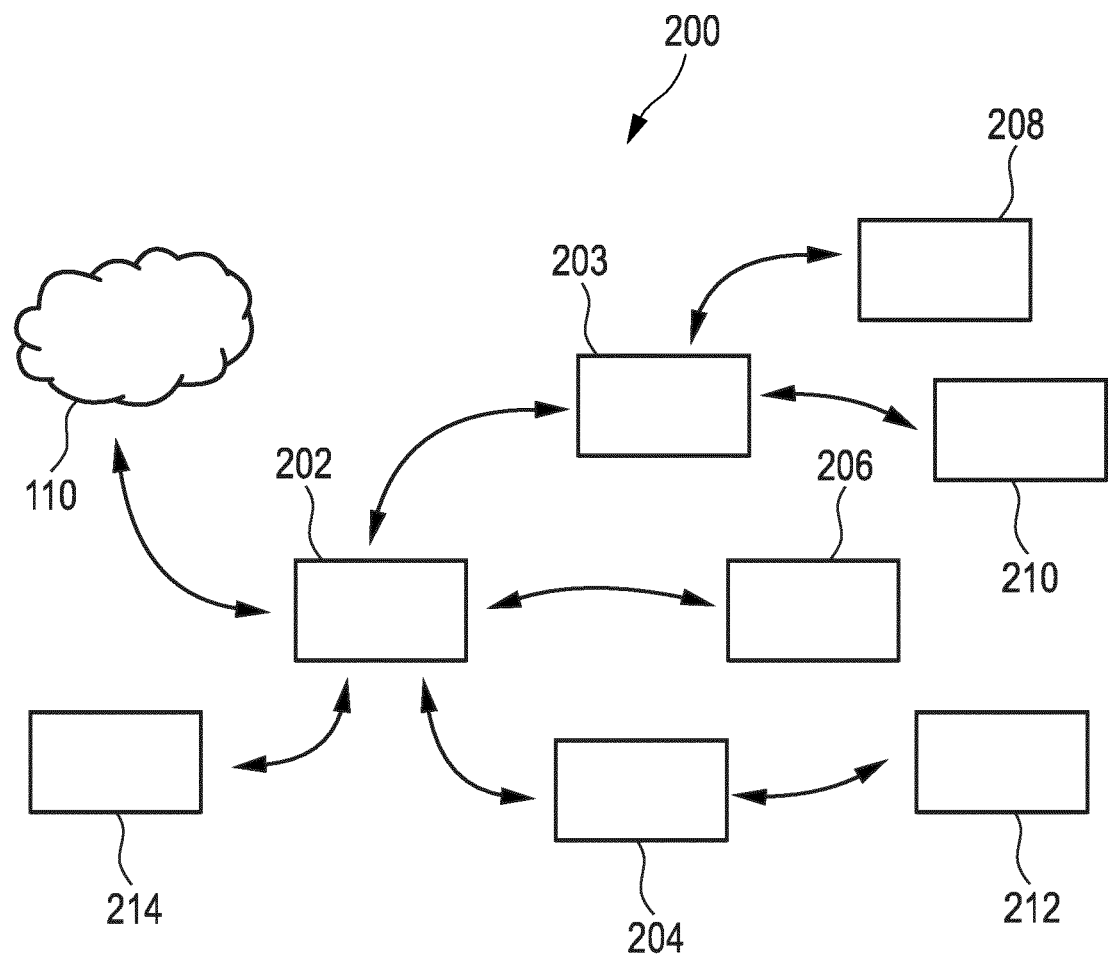
FIG. 2 shows an example of another wireless communication arrangement further comprising signal-repeater devices.

Growing numbers of end nodes and growing distances between the access points and end nodes require the use of signal-repeater devices, also referred to as repeaters. An example of a wireless communication arrangement comprising signal-repeater devices is shown in FIG. 2. The wireless communication arrangement 200 comprises an access point, or network gateway device 202, that is connected to the external wide range data communication network 110. End nodes 206 and 214 are suitably located for receiving wireless signals from and transmitting wireless signals to the access point 202. However, end nodes 208, 210 and 212 are at positions where no wireless signals from the access point are received that have sufficient signal quality to properly convey information carried by the signals. For enabling a successful wireless communication between the access point 202 and end nodes 208, 210 and 212, signal repeating devices 203, 204 are included in the wireless communication arrangement 200. In the particular wireless communication arrangement 200, signal-repeater device 203 enables wireless communication between the access point 202 and the end nodes 208 and 210, whereas signal-repeater device 204 enables wireless communication between the access point 202 and the end node 212. In another exemplary wireless communication arrangement (not shown), communication between the access point and a given end node is achieved via more than one signal-repeater device.

Typical signal-repeater devices consume larger amounts of power than typical end nodes, since the signal-repeater devices are much more involved in data communication than the end nodes. Signal-repeater devices are typically configured to receive wireless input signals that carry payload information or control information, and perform a signal repeating function involving a retransmission of an amplified wireless output signal that also carries the payload information or the control information. Additionally, some signal-repeater devices are configured to perform a signal-cleaning process, wherein the payload information or the control information is analyzed and reconstructed to correct detectable errors.

Access points need to be operated continuously in a regular operation mode since it handles the communication with the external wide range data communication network. However, a signal-repeater device needs only be on for facilitating communication between devices-access point, other signal-repeater devices, end nodes-that are part of the wireless communication arrangement under consideration.

Figure 3:
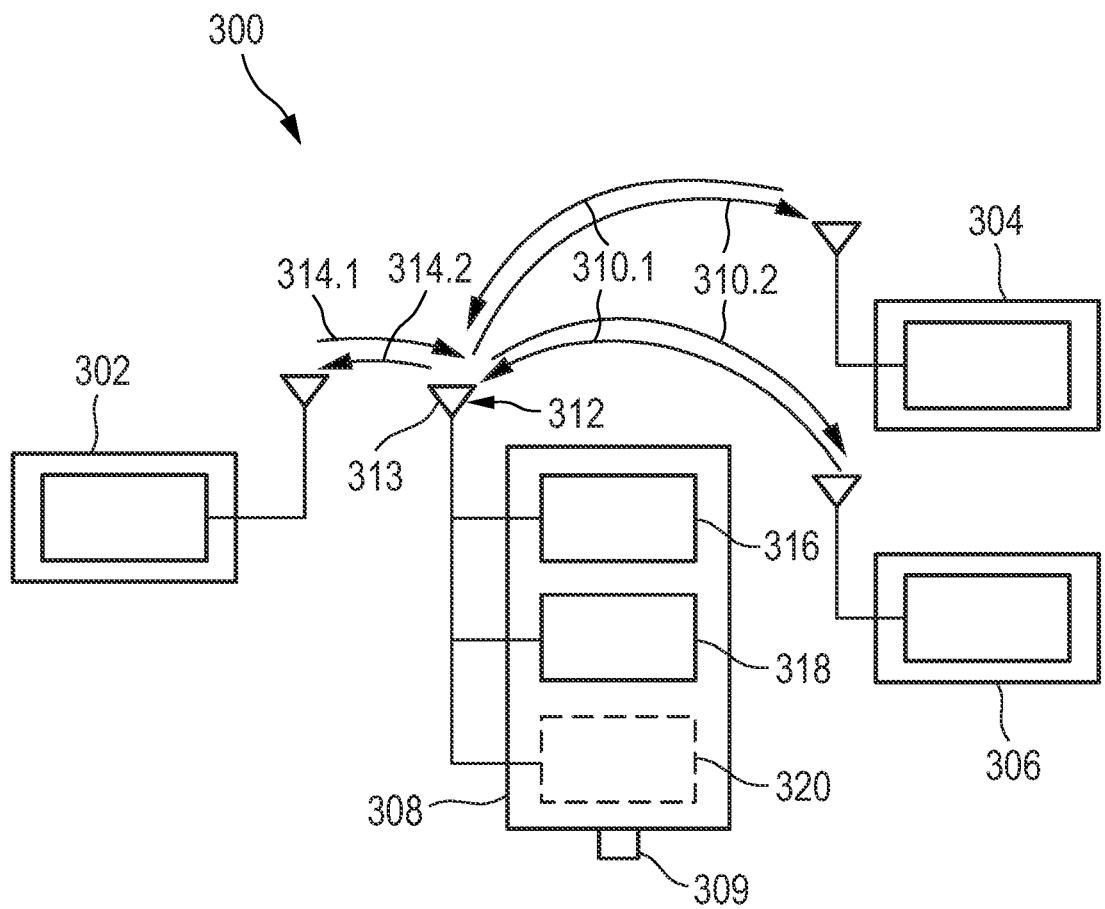
FIG. 3 shows a schematic representation of an embodiment of a wireless communication arrangement comprising a network gateway device, a signal-repeater device and two associated wireless transceiver devices.

FIG. 3 shows a block diagram of a wireless communication arrangement 300 that comprises a network gateway device or access point 302 for retransmitting wireless signals to and from two associated wireless transceiver devices 304 and 306. The transmission of wireless signals between the network gateway device 302 and the associated wireless transceiver devices 304, 306 is done via a signal-repeater device 308.

The wireless communication arrangement 300 is a connected lighting arrangement wherein the wireless transceiver device 304 is a lighting device and the wireless transceiver device 306 is a monitoring sensor.

The signal-repeater device 308 comprises a signal processing unit 316 that is configured to perform a signal receiving function involving reception, via a wireless signal receiving interface 312 comprising an antenna 313, of wireless input signals 310.1, 314.1. The wireless input signals transport payload information or control information between the network gateway device 302 and the associated wireless transceiver devices 304, 306. The signal processing unit 316 is configured to perform, in a regular repeater-operation mode, the signal receiving function and a signal repeating function involving a retransmission of an amplified wireless output signal 310.2, 314.2 carrying the payload information or the control.

In an exemplary signal repeating device, the signal receiving function also includes transforming the wireless signal into a corresponding electrical signal, and down-converting the electrical signal from a radio-frequency range to a base frequency range. Correspondingly, the signal repeating function also involves up-converting the electrical signal from the base frequency range to the radio frequency range.

The signal-repeater device 308 also comprises an operation control unit 318 that is configured to operate the signal processing unit in the regular repeater-operation mode and in a low-power repeater-operation mode, in which the signal repeating function is switched off. The operation control unit 318 is also configured to determine status information indicative of the associated external transceiver devices being respectively operated in a low-power transceiver-operation mode, and to switch off the signal repeating function upon determining, based on the determined status information, that each of the one or more associated external wireless transceiver devices is being operated in the low-power transceiver-operation mode.

Further, while the signal processing unit is being operated in the low-power repeater-operation mode, the operation control unit is configured to await reception of a predetermined repeater-wake-up signal, and, upon reception thereof, to switch to operation of the signal processing unit in the regular repeater-operation mode.

Thus, the associated wireless transceiver devices 304, 306 are operable in a respective regular transceiver-operation mode and can be further operable in a respective low-power transceiver-operation mode. The operation control unit 318 is configured to determine a current operation mode of the associated wireless transceiver devices. In an exemplary wireless communication arrangement, the associated wireless transceiver devices are configured to provide status information pertaining the current operation mode (i.e. regular transceiver-operation mode or low-power transceiver-operation mode) at predetermined points in time. In another exemplary wireless communication arrangement, the associated wireless transceiver devices are configured to provide status information upon transitioning from one operation mode to another operation mode. In yet another wireless communication arrangement, the signal-repeater device is advantageously configured to determine the current operation mode of the associated wireless transceiver device based on the payload information or the control information of the wireless input signals.

Upon determining that each of the associated wireless transceiver devices is operating in a low-power transceiver-operation mode, which involves a discontinuation of provision of wireless signals, the operation control unit switches off the signal repeating function and the signal-repeater device stops providing amplified wireless output signals, thereby reducing a power consumption of the signal-repeater device.

During the operation of the signal-repeater device in the regular repeater-operation mode, operational power suitable for operating the operation control unit and the signal processing unit in the regular repeater-operation mode is provided by a mains power-supply via a power input interface 309. In the signal-repeater device 308, operational power suitable for operating the operation control unit and the signal processing unit in the low-power repeater-operation mode is also provided by the mains power-supply via the power input interface 309.

The operation control unit of an exemplary signal-repeater device is configured to control operation of the signal processing unit to perform the signal receiving function in the low-power repeater-operation mode in a duty-cycled manner.

In an exemplary signal-repeater device, the operation control unit 318 is further configured to trigger, upon reception of the repeater-wake-up signal, a provision of a wireless transceiver-wake-up signal for instructing the at least one external wireless transceiver devices to switch off the low-power transceiver-operation mode and return to operation in a regular transceiver-operation mode. Thus, the reception of a repeater-wake-up signal results in both switching the signal repeating function back on and issuing a wireless transceiver-wake-up signal to at least one external associated wireless transceiver device.

The signal-repeater device 308 can additionally comprise, as indicated in FIG. 3 with a dashed line, a low-power wake-up radio receiver unit 320 configured to receive, while the signal-repeater device is operating in the low-power repeater-operation mode, the repeater-wake-up signal and to forward it to the operation control unit and not to the signal processing unit. In an exemplary wireless communication arrangement, the repeater-wake-up signal is transmitted in accordance with the same wireless communication protocol as the wireless input signals and the wireless output signals. In another wireless communication arrangement, the repeater-wake-up signal is transmitted in accordance with a communication protocol different than that used for transmitting the wireless input signal and the wireless output signals.

In an exemplary signal-repeater device, the low-power wake-up radio receiver unit is configured to receive the repeater-wake-up signal in a frequency band different from that used for the signal-receiving function of the signal processing unit, i.e., a frequency band different from that used by the input wireless signal and the output wireless signals. In this signal-repeater device, the operation control unit is configured to additionally switch off the signal-receiving function of the signal processing unit upon determining, based on the determined status information, that each of the one or more associated external wireless transceiver devices is being operated in the low-power transceiver-operation mode. Thus, in this exemplary signal-receiver device, both the signal receiving function and the signal transmitting function are switched off during operation in the low-power repeater-operation mode. The repeater-wake-up signals cannot be received by the signal processing unit since the signal receiving function is disabled. However, they are received by the low-power wake-up radio receiver unit and provided to the operation control unit.

Another suitable wireless communication arrangement is an Internet-of-Things (IoT) communication arrangement comprising IoT nodes such as, but not limited to, an access point as the network gateway device, signal-repeater devices, and wherein the wireless transceiver devices include controlled end nodes such as lighting devices, monitoring sensor end nodes and triggering sensor end nodes. Their capabilities for operating in a low-power operation mode and the triggering events for entering and leaving the low-power operation mode are summarized in the following Table 1.

TABLE 1

Triggering events for entering and leaving the low-power operation mode for different types of nodes in an IoT communication arrangement.

| IoT node type | Enter low-power operation mode | Leave low-power operation mode |
| --- | --- | --- |
| Access point | N.A. | N.A. |
| Repeater | All associated end nodes are in low-power operation mode | Reception of repeater-wake-up signal |
| Monitoring sensor node | In low-power operation mode when not called | Reception of wireless transceiver-wake-up signal |
| Triggering sensor node | Activation from access point. When in low-power operation mode, nodes are still alert for trigger events. | Reception of wireless transceiver-wake-up signal or detection of a trigger event |

Figure 4:
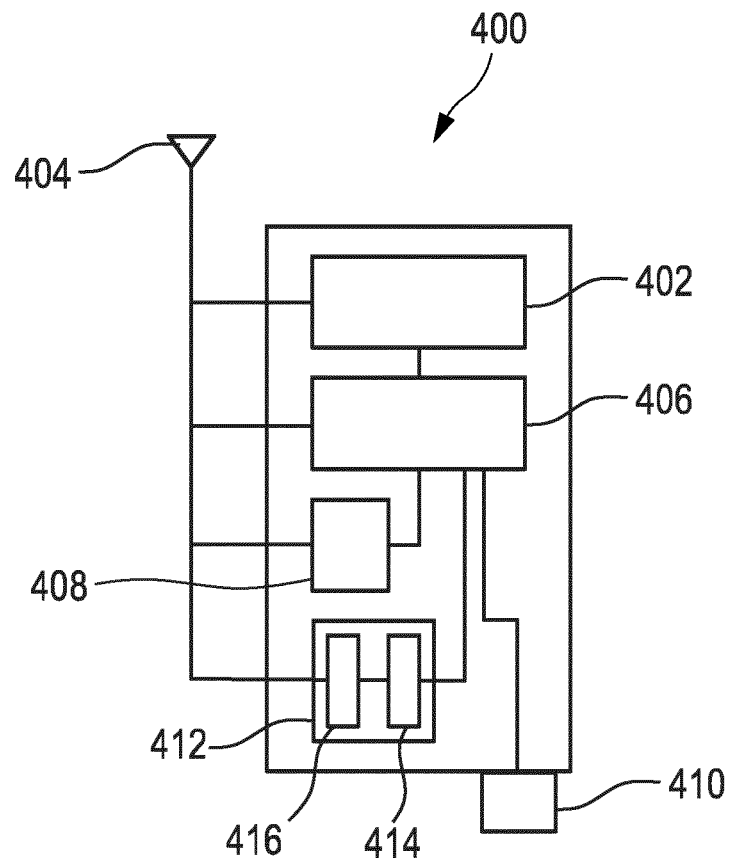
FIG. 4 shows a schematic block diagram of an embodiment of a signal-repeater device.

FIG. 4 shows another embodiment of a signal-repeater device 400. The signal-repeater device comprises, as explained with reference to signal-repeater device 308 of FIG. 3, a signal processing unit 402, connected to an antenna 404, and an operation control unit 406. The signal-repeater device 400 additionally comprises a low-power wake-up radio receiver unit 408 configured to receive, while the signal-repeater device is operating in the low-power repeater-operation mode, the repeater-wake-up signal and to forward it to the operation control unit 406 and not to the signal processing unit 402. The signal-repeater device 400 additionally comprises a power input interface 410 configured to receive from an external mains power-supply (not shown) operational power suitable for operating the operation control unit 406 and the signal processing unit 402 in the regular repeater-operation mode. Further, the signal-repeater device comprises a secondary power supply unit 412 configured to provide operational power suitable for operating the operation control unit 406 and the signal processing unit 402 and the low-power wake-up radio receiver unit 408 in the low-power repeater-operation mode. In this alternative signal-repeater device, the operation control unit 406 is additionally configured to switch a supply of operational power between the mains power-supply, via the power input interface 410, and the secondary power supply unit depending on whether the signal processing unit is to be operated in the regular repeater-operation mode or in the low-power repeater-operation mode. Thus, during operation in the low-power repeater-operation mode, no power is directly drawn from the mains power supply. Alternative secondary power supply units comprise a battery, a rechargeable battery, a capacitor, a supper capacitor, a photovoltaic solar cell, or any other suitable power supply device.

The secondary power supply unit 412 of signal-repeater device 400 comprises a rechargeable internal power supply device 414 and a radio-power harvesting unit 416 that includes a radio receiver interface and that is configured to collect electromagnetic power from received radio signals, to transform the collected electromagnetic power into electrical power and to charge the rechargeable internal power supply device with the electrical power for powering operation of the signal-repeater device in the low-power repeater-operation mode. Thus, power harvested from radio signals received by antenna 404 of a radio receiver interface is used to charge the rechargeable internal power supply device for providing the operational power suitable for operating the operation control unit and the signal processing unit in the low-power repeater-operation mode.

In an exemplary signal-receiver device, wireless input signals, repeater-wake-up signals and radio signals for power harvesting are radio-frequency signals received by a same antenna, such as the antenna 404 of the signal-repeater device 400 of FIG. 4. However, alternative signal-receiver devices use two or more antennas for receiving the wireless input signals, repeater-wake-up signals and radio signals for power harvesting.

The operation control units 318 and 406 of the signal-repeater devices 308 of FIG. 3 and 400 of FIG. 4 respectively can be also configured to evaluate received operation capability data indicative of a capability of the respective external wireless transceiver devices to be operated in the low-power transceiver-operation mode; and upon determining that not all associated external wireless transceiver devices are capable of being operated in the low-power transceiver-operation mode, to refrain from determining the status information, thereby operating the signal processing unit only in the regular repeater-operation mode.

Thus, upon determining that there is at least one external wireless transceiver device that is associated and that is not operable in a low-power transceiver-operation mode the operation control unit stops determining the status information, which means that, under these circumstances, it cannot switch off the signal repeating function and operates only in the regular repeater-operation mode. In a preferred signal-repeater device, the operation control unit is configured, upon determining that not all associated external wireless transceiver devices are capable of being operated in the low-power transceiver-operation mode, to provide an operation-mode warning signal indicative thereof to the external network gateway device.

Figure 5:
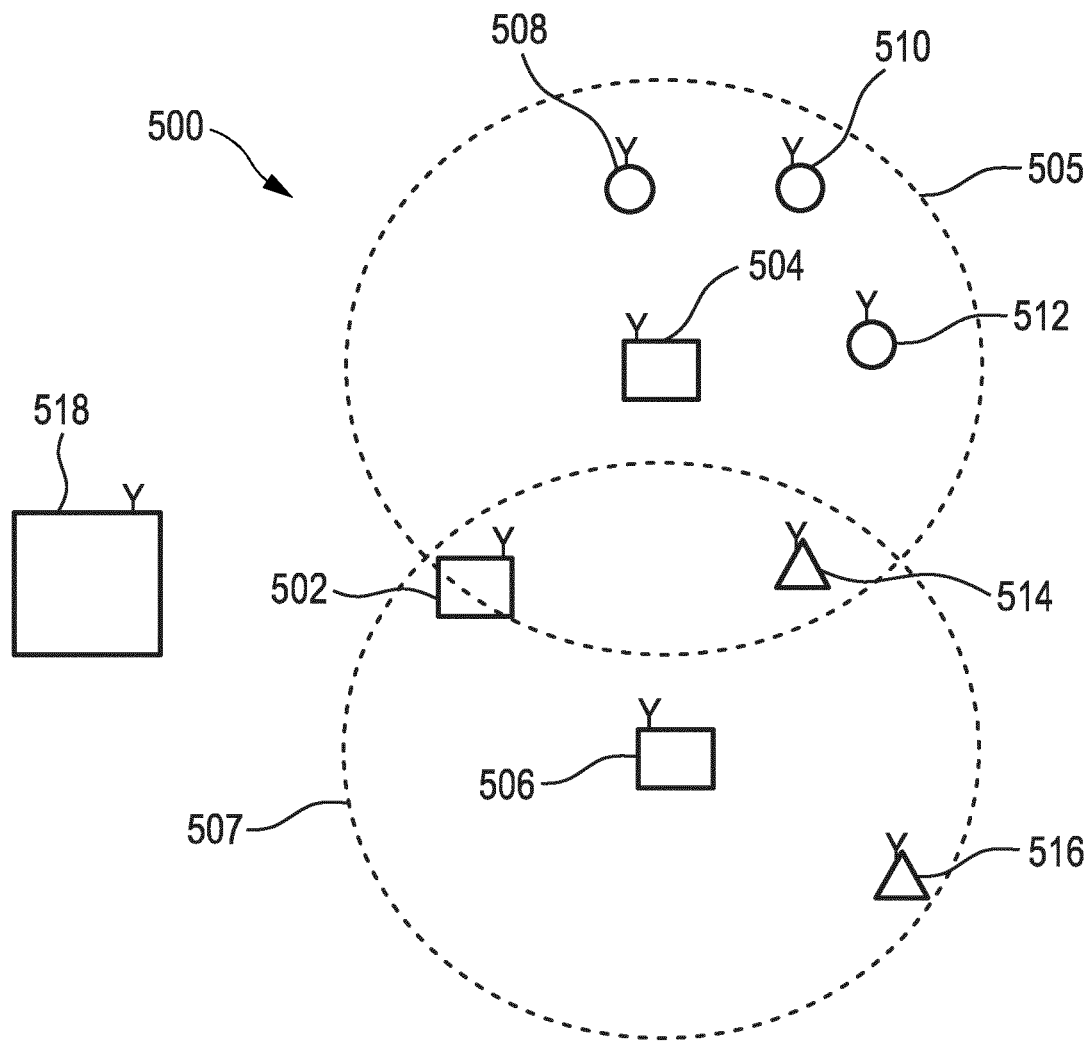
FIG. 5 shows a schematic representation of another embodiment of a wireless communication arrangement comprising a network gateway device, two signal-repeater devices a plurality of wireless transceiver devices and an association control unit.

FIG. 5 shows a diagram of an exemplary embodiment of a wireless communication arrangement 500. The wireless communication arrangement 500 comprises a network gateway device 502 for relaying data communication between the wireless transceiver device and an external wide range data communication network (not shown), two signal-repeater devices 504, 506 and a plurality of wireless transceiver devices 508, 510, 512, 514, and 516.

Those wireless transceiver devices located within the dashed circle 505, which represents a signal extension range of the signal-repeater device 504, are suitable for providing wireless input signals to and receiving wireless output signals from signal repeating device 504. Correspondingly, those wireless transceiver devices located within the dashed circle 507, which represents a signal extension range of the signal-repeater device 506, are suitable for providing wireless input signals to and receiving wireless output signals from signal repeating device 506. According to this scheme, wireless transceiver devices 508, 510, 512, and 514 are suitable for communicating wireless signals with signal-repeater device 504 and wireless transceiver devices 514 and 516 are suitable for communicating wireless signals with signal-repeater device 506.

Furthermore, wireless transceiver devices 508, 510, and 512, depicted as circles in FIG. 5, are operable in a regular transceiver-operation mode and in a low-power transceiver-operation mode. However, wireless transceiver devices 514 and 516 are only operable in a regular transceiver-operation mode and not in a low-power transceiver-operation mode.

At a given moment in time, wireless transceiver devices 508, 510, 512 and 514 are associated with signal-repeater device 504. At the same given moment in time wireless transceiver device 516 is associated with signal-repeater device 506. Wireless transceiver devices communicate with the network gateway device solely via their respective associated signal-repeater device.

Thus, at the given point in time, none of the signal-repeater devices is operable in the low-power repeater-operation mode, since at least one of the respective associated wireless transceiver devices, 514 and 516, cannot be operated in a low-power transceiver-operation mode.

The operation control unit of signal-repeater device 504 is further configured to maintain an updatable transceiver-device list comprising transceiver-device data identifying currently associated external wireless transceiver devices (in this case 508, 510, 512 and 514), currently non-associated wireless transceiver devices within the signal extension range of the signal-repeater device (none in this case) and those currently associated and non-associated wireless transceiver devices having the capability to be operated in the low-power transceiver-operation mode (in this case 508, 510 and 512). An example of such an updatable transceiver-device list for the signal-repeater device 504 is shown in Table 2. The transceiver-device list also includes transceiver-device data identifying a maximum number of external wireless transceiver devices that can be associated to the signal-repeater device (not shown). An exemplary transceiver-device list has a limited number of entries for allocating transceiver devices within the signal extension range that corresponds to the maximum number of external wireless transceiver devices that can be simultaneously associated to the signal-repeater device. This limitation is, for an exemplary signal-repeater device, based on hardware or software limitations imposed to guarantee simultaneous exchange of wireless signals between the network gateway device and the maximum number of associated external wireless transceiver devices.

TABLE 2

Updatable transceiver-device list for the signal-repeater device 504

| Transceiver device within signal extension range | Associated | Low-power operation |
|---|---|---|
| 508 | Yes | Yes |
| 510 | Yes | Yes |
| 512 | Yes | Yes |
| 514 | Yes | No |

Correspondingly, the operation control unit of signal-repeater device 506 is further configured to maintain an updatable transceiver-device list comprising transceiver-device data identifying currently associated external wireless transceiver devices (in this case 516), currently non-associated wireless transceiver devices within the signal extension range of the signal-repeater device (in this case 514) and those currently associated and non-associated wireless transceiver devices having the capability to be operated in the low-power transceiver-operation mode (none in this case). An example of such an updatable transceiver-device list for the signal-repeater device 506 is shown in Table 3. The transceiver-device list also includes transceiver-device data identifying a maximum number of external wireless transceiver devices that can be associated to the signal-repeater device (not shown).

TABLE 3

Updatable transceiver-device list for the signal-repeater device 506

| Transceiver device within signal extension range | Associated | Low-power operation |
|---|---|---|
| 514 | No | No |
| 516 | Yes | No |

The operation control unit of the signal repeating devices 504, 506 is configured to provide the transceiver-device list to the network gateway device.

The wireless communication arrangement 500 further comprises an association control unit 518 configured to receive and evaluate the transceiver-device lists provided by the signal-repeater devices. In another exemplary wireless communication arrangement, the association control unit is integrated in the network gateway device. In another exemplary network communication arrangement, the association control unit is configured to communicate with the network gateway device via the external wide range data communication network, thus enabling a remote operation of the association control unit.

The association control unit 518 is further configured to generate, using the transceiver-device list, respective updated transceiver-device lists associating to a respective signal-repeater device, and in dependence on the respective capability to be operated in the low-power transceiver-operation mode, a number of wireless transceiver devices that is equal to or lower than the maximum number of external wireless transceiver devices that can be associated to the respective signal-repeater device for maximizing the number of signal-repeater devices operable in the low-power repeater-operation mode. The association control unit is further configured to provide the updated transceiver-device list to the respective signal-repeater device.

In the particular example described with reference to FIG. 5, both signal-repeater devices 504, 506 cannot be operated in the low-power repeater-operation mode because at least one of the associated wireless repeater devices, 514 and 516 respectively, only operate in the regular transceiver-operation mode.

In order to maximize the number of signal-repeater devices operable in the low-power repeater-operation mode, and after evaluating the transceiver-device data and in accordance to a predetermined association rule, the association control unit generates respective updated lists as indicated in table 4 for signal-repeater device 504 and table 5 for signal-repeater device 506, and provides these lists to the signal-repeater devices for updating the respective updatable transceiver-device list.

TABLE 4

Updated transceiver-device list for the signal-repeater device 504

| Transceiver device | Associated | Low-power operation |
|---|---|---|
| 508 | Yes | Yes |
| 510 | Yes | Yes |
| 512 | Yes | Yes |
| 514 | No | No |

TABLE 5

Updated transceiver-device list for the signal-repeater device 506

| Transceiver device | Associated | Low-power operation |
|---|---|---|
| 514 | Yes | No |
| 516 | Yes | No |

Once the transceiver-device lists are updated in their respective signal-repeater devices, the respective operation control units will control operation in the regular repeater-operation mode and in the low-power repeater-operation mode in dependence on respective operation modes of the currently associated external wireless transmitted devices included in the transceiver device list. Since in the case of signal-repeater device 504 all associated wireless transceiver devices are not operable in the low-power transceiver-operation mode, the operation control unit can switch off the signal repeating function upon determining, based on the determined status information, that each of the one or more associated external wireless transceiver devices 508, 510, 512 is being operated in the low-power transceiver-operation mode.

In another exemplary signal-repeater device, the updatable transceiver-device list further comprises transceiver-device data pertaining to time spans during which the wireless transceiver device is operated in the low-power transceiver-operation mode. In this case, the association control unit is advantageously configured to determine and provide the updated transceiver-device list further based on the time spans.

Other transceiver-device lists also include position information pertaining to a location of the respective wireless transceiver devices, such as, for instance, a room in which the wireless transceiver device is installed. The association control unit may then use an association rule further based on the position information to associate the transceiver devices to a corresponding signal-repeater device.

Figure 6:
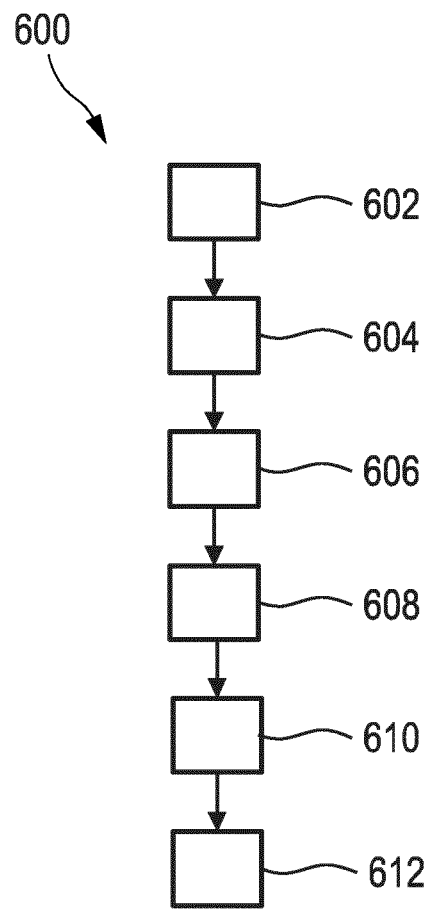
FIG. 6 shows a flow diagram of an embodiment of a method for operating a signal-repeater device.

FIG. 6 shows a flow diagram of an embodiment of a method 600 for operating a signal-repeater device, comprising, in a regular repeater-operation mode, performing, in a step 602, a signal receiving function involving reception of wireless input signals which transport payload information or control information between an external network gateway device and one or more external wireless transceiver devices associated with the signal-repeater device. The method also comprises performing, in a step 604, a signal repeating function involving a retransmission of an amplified wireless output signal carrying the payload information or the control information. The method also comprises determining, in a step 606, status information indicative of the associated external transceiver devices being respectively operated in a low-power transceiver-operation mode. The method further comprises, in a step 608, switching to a low-power repeater-operation mode, in which the signal repeating function is switched off upon determining from the status information that each of the one or more associated external wireless transceiver devices is being operated in the low-power transceiver-operation mode. While in the low-power repeater-operation mode, the method comprises, in a step 610, awaiting reception of a predetermined repeater-wake-up signal, and, upon reception thereof, in step 612, switching to operation in the regular repeater-operation mode.

In summary, the invention is directed to a signal-repeater device being operable in regular repeater-operation mode and in a low-power repeater-operation mode requiring less operational power than the regular repeater-operation mode, and that comprises a signal processing unit which performs, in the regular repeater-operation mode, a signal receiving function and a signal repeating function, and an operation control unit configured to determine status information indicative of associated external transceiver devices being respectively operated in a low-power transceiver-operation mode, operate the signal processing unit in the low-power repeater-operation mode by switching off the signal repeating function upon determining, based on the determined status information, that each of the associated external wireless transceiver devices is being operated in the low-power transceiver-operation, thus reducing the power consumption of the signal-repeater device, and switch to operation of the signal processing unit in the regular repeater-operation mode upon reception of a predetermined repeater-wake-up signal.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A signal-repeater device for wireless signals, comprising:
a signal processor which is configured to perform a signal receiving function involving reception of wireless input signals which transport payload information or control information between an external network gateway

17 device and one or more external wireless transceiver devices associated with the signal-repeater device, and which is configured to perform, in a regular repeater-operation mode, the signal receiving function and a signal repeating function involving a retransmission of an amplified wireless output signal carrying the payload information or the control information; and an operation controller which is configured:

to operate the signal processor in the regular repeater-operation mode and in a low-power repeater-operation mode, in which the signal repeating function is switched off;

to determine status information indicative of the associated external transceiver devices being respectively operated in a low-power transceiver-operation mode;

to switch off the signal repeating function upon determining from the status information that each of the one or more associated external wireless transceiver devices is being operated in the low-power transceiver-operation mode; and while the signal processor is being operated in the low-power repeater-operation mode, to await reception of a predetermined repeater-wake-up signal, and, upon reception thereof, to switch to operation of the signal processor in the regular repeater-operation mode; and the signal-repeater device further comprising:

a low-power wake-up radio receiver unit configured to receive, while the signal-repeater device is operating in the low-power repeater-operation mode, the repeater-wake-up signal and to forward it to the operation controller and not to the signal processor.

2. The signal-repeater device of claim 1, wherein the operation controller is configured, upon reception of the repeater-wake-up signal, to trigger a provision of a wireless transceiver-wake-up signal for instructing the at least one external wireless transceiver devices to switch off the low-power transceiver-operation mode and return to operation in a regular transceiver-operation mode.

3. The signal-repeater device of claim 1, wherein:

the low-power wake-up radio receiver unit is configured to receive the repeater-wake-up signal in a frequency band different from that used for the signal-receiving function of the signal processor; and wherein the operation controller is configured to additionally switch off the signal-receiving function of the signal processor upon determining, based on the determined status information, that each of the one or more associated external wireless transceiver devices is being operated in the low-power transceiver-operation mode.

4. The signal-repeater device of claim 1, wherein the operation controller is configured to control operation of the signal processor to perform the signal receiving function in the low-power repeater-operation mode in a duty-cycled manner.

5. The signal-repeater device of claim 1, further comprising:

a power input interface configured to receive from an external mains power-supply operational power suitable for operating the operation controller and the signal processor in the regular repeater-operation mode;

a secondary power supply configured to provide operational power suitable for operating the operation controller and the signal processor in the low-power repeater-operation mode; and wherein the operation controller is configured to switch a supply of operational power between the mains power-supply

18 and the secondary power supply depending on whether the signal processor is to be operated in the regular repeater-operation mode or in the low-power repeater-operation mode.

6. The signal-repeater device of claim 5, wherein the secondary power supply comprises:

a rechargeable internal power supply device; and a radio-power harvester that includes a radio receiver interface and that is configured to collect electromagnetic power from received radio signals, to transform the collected electromagnetic power into electrical power and to charge the rechargeable internal power supply device with the electrical power for powering operation of the signal-repeater device in the low-power repeater-operation mode.

7. The signal-repeater device of claim 1, wherein the operation controller is configured to evaluate received operation capability data indicative of a capability of the respective external wireless transceiver devices to be operated in the low-power transceiver-operation mode; and upon determining that not all associated external wireless transceiver devices are capable of being operated in the low-power transceiver-operation mode, to refrain from determining the status information, thereby operating the signal processor only in the regular repeater-operation mode.

8. The signal-repeater device of claim 7, wherein the operation controller is configured, upon determining that not all associated external wireless transceiver devices are capable of being operated in the low-power transceiver-operation mode, to provide an operation-mode warning signal indicative thereof to the external network gateway device.

9. The signal-repeater device of claim 7, wherein the operation controller is further configured:

to maintain an updatable transceiver-device list comprising transceiver-device data identifying:

a maximum number of external wireless transceiver devices that can be simultaneously associated to the signal-repeater device currently associated external wireless transceiver devices within a signal extension range of the signal-repeater device;

currently non-associated wireless transceiver devices within the signal extension range of the signal-repeater device; and those currently associated and those currently non-associated wireless transceiver devices having the capability to be operated in the low-power transceiver-operation mode; and to refrain from determining the status information, thereby operating the signal processor only in the regular repeater-operation mode, while at least one of the currently associated external wireless transceiver devices on the transceiver-device list lacks the capability to be operated in the low-power transceiver-operation mode.

10. The signal-repeater device of claim 7, wherein the operation controller is further configured:

to maintain an updatable transceiver-device list comprising transceiver-device data identifying:

a maximum number of external wireless transceiver devices that can be simultaneously associated to the signal-repeater device;

currently associated external wireless transceiver devices within a signal extension range of the signal-repeater device;

currently non-associated wireless transceiver devices within the signal extension range of the signal-repeater device; and those currently associated and those currently non-associated wireless transceiver devices having the capability to be operated in the low-power transceiver-operation mode;

to provide the transceiver-device list to the external network gateway device; and to operate the signal processor in the regular repeater-operation mode or in the low-power repeater-operation mode in dependence on control information received from the external network gateway device.

11. A wireless communication arrangement, comprising:
at least one wireless transceiver device;
a network gateway device for relaying data communication between the wireless transceiver device and an external wide range data communication network;
at least one signal-repeater device according to claim 1 associated with the at least one wireless transceiver device, for performing the repeating function between the network gateway device and the at least one wireless transceiver devices associated with the signal-repeater device.

12. The wireless communication arrangement of claim 11, comprising at least two signal-repeater devices, further comprising an association control unit, which is configured:
to receive and evaluate the transceiver-device lists provided by the signal-repeater devices;
to generate, using the received transceiver-device lists, respective updated transceiver-device lists associating to a respective signal-repeater device, in dependence on the respective capability to be operated in the low-power transceiver-operation mode, a number of wireless transceiver devices that is equal to or lower that the maximum number of external wireless transceiver devices that can be associated to the respective signal-repeater device for maximizing the number of signal-repeater devices operable in the low-power repeater-operation mode; and
to provide the updated transceiver-device list to the respective signal-repeater device as the control information.

13. A method for operating a signal-repeater device, comprising, in a regular repeater-operation mode:
performing, via a signal processor, a signal receiving function involving reception of wireless input signals which transport payload information or control information between an external network gateway device and one or more external wireless transceiver devices associated with the signal-repeater device;
performing, via the signal processor, a signal repeating function involving a retransmission of an amplified wireless output signal carrying the payload information or the control information;
determining, via an operation controller, status information indicative of the associated external transceiver devices being respectively operated in a low-power transceiver-operation mode;
switching, via the operation controller, to a low-power repeater-operation mode, in which the signal repeating function is switched off upon determining from the status information that each of the one or more associated external wireless transceiver devices is being operated in the low-power transceiver-operation mode; and
while in the low-power repeater-operation mode, awaiting reception of a predetermined repeater-wake-up signal, and, upon reception thereof, switching to operation in the regular repeater-operation mode, the method further comprising:
receiving, while the signal-repeater device is operating in the low-power repeater-operation mode, the repeater-wake-up signal and forwarding it to the operation controller and not to the signal processor.

14. A non-transitory computer readable medium comprising instructions which, when the instructions are executed by a computer, cause the computer to carry out the steps of the method of claim 13.

\* \* \* \* \*